(12) United States Patent
Terada et al.

(10) Patent No.: US 6,258,432 B1
(45) Date of Patent: Jul. 10, 2001

(54) OPTICAL INFORMATION RECORDING MEDIUM AND PRODUCTION METHOD THEREOF

(75) Inventors: Masato Terada; Tatsuya Okamura; Kazuyuki Furuya, all of Fuji (JP)

(73) Assignee: Asahi Kasei Kabushiki Kaisha (JP)

( * ) Notice: Subject to any disclaimer, the term of this patent is extended or adjusted under 35 U.S.C. 154(b) by 0 days.

(21) Appl. No.: 09/284,312

(22) PCT Filed: Nov. 14, 1996

(86) PCT No.: PCT/JP96/03342

§ 371 Date: Apr. 27, 1999

§ 102(e) Date: Apr. 27, 1999

(87) PCT Pub. No.: WO98/21718

PCT Pub. Date: May 22, 1998

(51) Int. Cl.$^7$ .................................................. B32B 3/02
(52) U.S. Cl. .................. 428/64.1; 428/64.2; 428/64.4; 428/64.5; 428/913; 430/270.12; 430/270.13; 430/495.1; 430/945; 369/283
(58) Field of Search .................. 428/64.1, 64.2, 428/64.4, 64.5, 688, 913; 430/270.12, 270.13, 495.1, 945; 369/283

(56) References Cited

U.S. PATENT DOCUMENTS 5,059,462 * 10/1991 Kurisu et al. .................. 428/64.1
5,450,380   9/1995 Toide et al. .

FOREIGN PATENT DOCUMENTS

| 63-144437 | 6/1988 | (JP) . |
| 64-86342A | 3/1989 | (JP) . |
| 1-285035 | 11/1989 | (JP) . |
| 3-214439 | 9/1991 | (JP) . |
| 4-26935 | 1/1992 | (JP) . |
| 5-303782 | 11/1993 | (JP) . |
| 9-35328 | 2/1997 | (JP) . |

OTHER PUBLICATIONS

T. Sugaya, et al., Jpn. Appl. Phys. vol. 32 (1993) pp. 5402.
T. Ohta, et al., Jpn. Appl. Phys. vol. 32 (1993) pp. 5214.

* cited by examiner

*Primary Examiner*—Elizabeth Evans
(74) *Attorney, Agent, or Firm*—Pennie & Edmonds LLP

(57) ABSTRACT

An optical information recording medium comprising a thin plastic substrate of 0.6 mm or thinner, wherein the substrate is protected against strain without being limited by a film structure and a film formation condition. A single-layer or multilayer thin film (70) is formed on a plastic disk-like substrate having a center hole (10). This thin film (70) has a strain relief area (72) inside a recording area (71). This strain relief area (72) is formed by setting an outer diameter of an undeposited inner portion (5) to a value satisfying the following formula (1), for example: $A_0 \leq A_X \leq -0.172P + 0.163$ where $A_0$: diameter of center hole, $A_X$: outer diameter of undeposited inner portion, P: total strain occurring in thin film when film depositing.

9 Claims, 6 Drawing Sheets

OPTICAL INFORMATION RECORDING MEDIUM AND PRODUCTION METHOD THEREOF

TECHNICAL FIELD

The present invention concerns an optical information recording medium capable of at least reproducing information by irradiation of a laser beam or the like and it particularly, relates to an optical disc comprising a plastic substrate with less strain in the substrate and having good mechanical accuracy even if the thickness is as thin as 0.6 mm for instance.

BACKGROUND ART

Optical information recording media have attracted attention due to their high density and large capacity and have been used in various application uses. For instance, optical discs used exclusively for reading include, for example, compact discs or CD-ROM used exclusively for data reading, and they are used generally, for example, in the field of musics, computers and games. Further, writing once type optical discs capable of recording only once have been used in document filing systems and data filing systems, particularly, in the field in which data security is important.

Further, re-writable optical discs capable of erasing recorded information and re-recording are expected in that they contribute to extension for the application uses of the optical discs since they can correct or update data and can be used repeatedly by rewriting. For the re-writable optical discs described above, magneto-optic discs or phase-change type optical discs have been put to practical use and used in data files or the like.

In order to further increase the capacity of the optical disc system, it is necessary to increase the recording density. Then, for increasing the density, an effective method is to decrease a spot diameter of a laser. The spot diameter is in proportion with a laser wavelength and in inverse proportion with numerical aperture (NA) of an objective lens. Therefore, increase of NA is an effective means for decreasing the spot diameter but, as the NA increases, aberration increases relative to the tilt of a disc and the effect of the tilting angle ("Tilt") of the disc is increased.

Since the aberration is in proportion with the thickness of the substrate and $(NA)^3$, where NA should be increased, the aberration can be reduced by reducing the thickness of the substrate.

For example, in a 1.2 mm substrate used in conventional CD, if NA is increased to 0.6 or greater, the tilting angle is allowed to only about 4 Mrad for the disc, and it is not practical considering the actual using circumstance or productivity. However, when a substrate of 0.6 mm thickness is used for instance, the tilting angle of the disc can be permitted to about 8 Mrad even if NA is 0.6, and this is within a sufficiently practical usable range (T. Sugaya, et al.: Jpn. Appl. Phys. 32 (1993), 5402., T. Ohta, et al.: Jpn. Appl. Phys. 32 (1993) 5214).

Meanwhile, in the case of using the 0.6 mm substrate, since the recording capacity per volume can be doubled in simple way compared with the 1.2 mm substrate, decreasing thickness of the substrate is desirable also in order that the capacity can be increased without enlarging the size of a medium or a device.

As described above, a method of decreasing the thickness of the substrate is effective for reducing the negative effect by "Tilt", and 0.6 mm thickness will become predominant as the thickness of high density optical disc substrates in next generation in the feature.

Figure 1:
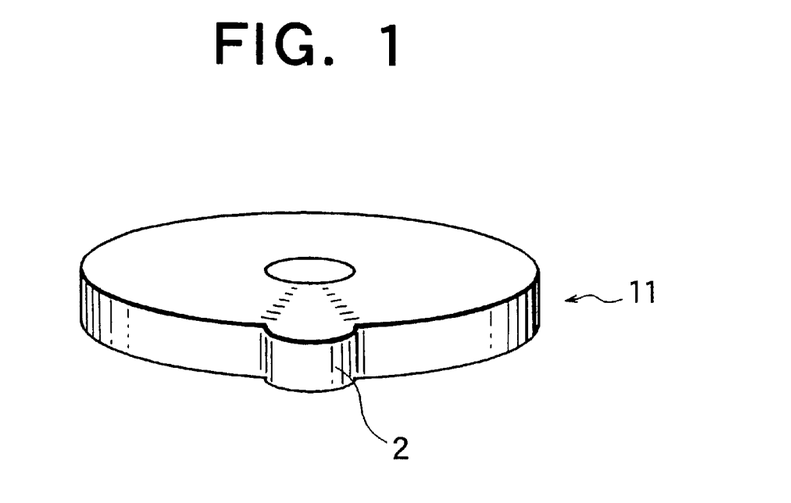
FIG. 1 is a schematic perspective view illustrating strain caused to a substrate of an optical disc.

On the other hand, plastic molding products are usually used as the substrate for the optical discs but, since the strength of a plastic substrate has a correlation with a thickness of the substrate, the strength of the substrate is weakened as the thickness is reduced. Therefore, in a plastic substrate with the thickness as thin as 0.6 mm, strain (partial deformation) 2 may sometimes occurs to a substrate 11 due to stress or heat caused in a thin film upon deposition of the film as shown in FIG. 1.

The strain caused to the substrate results a problem that no satisfactory mechanical accuracy can be obtained. That is, since the strain in the substrate worsens particularly focus acceleration, laser tracking is no more possible and off focus occurs to cause an error. In a worst case, focusing is out of the control to cause a significant trouble.

The strain in the substrate is attributable to the stress occurring in the entire thin films (entire stress) laminated on the substrate and the entire stress is determined as a product of the internal stress for the entire thin films and the entire film thickness. Accordingly, as a method of suppressing the strain in the plastic substrate, there may be considered a method for reducing the thickness of thin films disposed on the substrate, or a method for reducing the internal stress of the thin films by depositing the thin films with a material resulting less stress or by changing the film-depositing conditions.

However, since the methods decrease the degree of freedom for the film design and restrict the film-depositing conditions, they can not be always compatible with satisfactory signal characteristics.

The present invention has been accomplished taking notice on the problems in the prior art and it is a subject thereof to provide an optical disc comprising a plastic substrate with a thickness as thin as 0.6 mm, not showing the restriction for the film constitution or film-depositing conditions and free from strain of the substrate.

DISCLOSURE OF THE INVENTION

Generally, in the production of an optical disc, a disc-shaped substrate having a central hole is molded with a plastic by means of an injection molding process or the like, the thus obtained substrate is attached to a film-depositing device such as a sputtering device, and thin films such as a dielectric layer, a recording layer and a reflection layer are deposited successively in accordance with the film constitution on one surface of the substrate.

Figure 2:
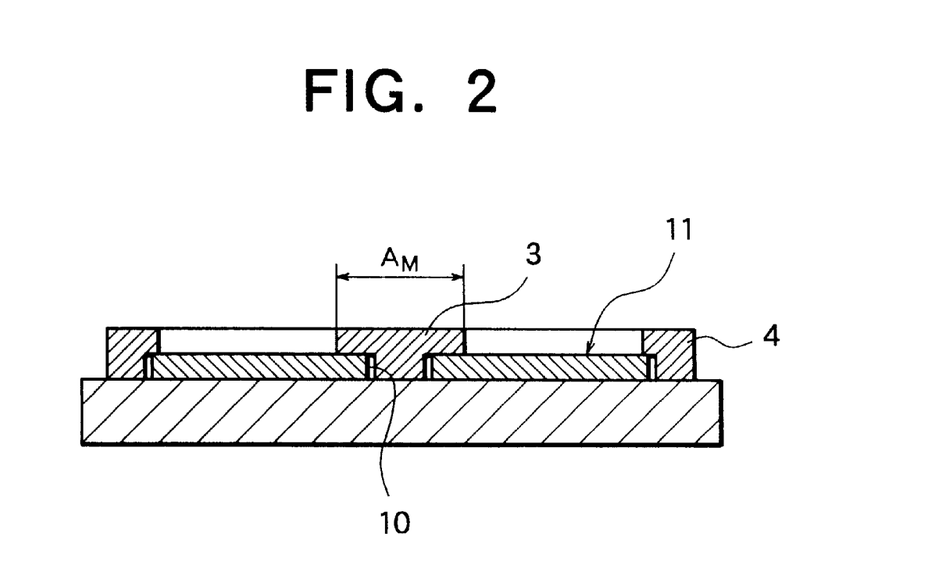
FIG. 2 is a schematic cross sectional view illustrating an inner circumferential mask and an outer circumferential mask for supporting a substrate of an optical disc in a film depositing device.
Figure 3:
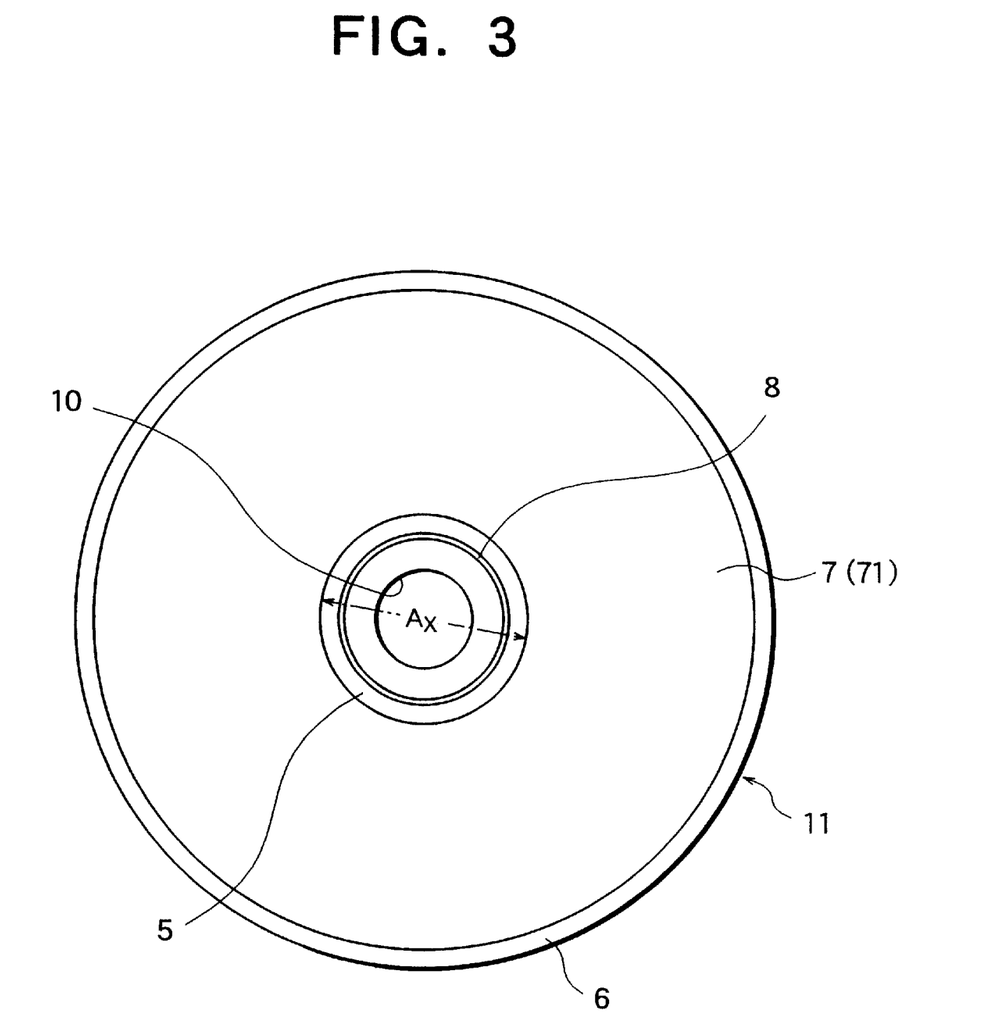
FIG. 3 is a schematic front elevational view illustrating a thin film depositing surface of a conventional optical disc.

Generally, upon the films deposition, as shown in FIG. 2, the substrate 11 is supported by an inner circumferential mask 3 fitted into a central hole 10 from above and an outer circumferential mask 4 covering the entire edge from above, and the films deposited on the upper surface. As a result, as shown in FIG. 3, undeposited portions 5 and 6 without the film are formed for the inner circumferential portion covered with the inner circumferential mask 3 and the edge covered with the outer circumferential mask 4, and a deposited portion 7 is formed between both of the undeposited portions 5 and 6. That is, the diameter Ax for the undeposited inner portion 5 is substantially equal with the diameter $A_M$ for the upper portion of the inner circumferential mask 3. Then, substantially the entire portion of the deposited portion 7 is ensured as a memory region 71.

In the production of the substrate by injection molding, since a circumferential groove (flaw formed by a finger portion of a stamper stopper for securing the stamper) 8 is formed slightly outward of the central hole 10 in the prior art, the diameter $A_M$ for the upper portion of the inner circumferential mask 3 is made, for example, to 37 mm or more so that a film is not deposited inside the circumferential groove 8. With the viewpoint described above, the diameter $A_X$ for the undeposited inner portion 5 of the conventional optical disc was made for example, to 37 mm or more.

As described above, in the conventional optical disc, the undeposited portion and the deposited portion are formed on the substrate and, as a result of an earnest study taking notice on the causality between this constitution and the strain caused to the substrate, the present inventors have found that the stress is concentrated to a boundary between the deposited portion and the undeposited inner portion since the deposited portion with the stress and the undeposited portion without the stress are present within the plane of the substrate and, as a result, strain occurs to the substrate. Then, the present invention has been accomplished based on the finding that the strain of the substrate can be relieved by displacing the boundary between the deposited portion and the undeposited inner portion more inwardly as compared with the prior art.

Figure 4:
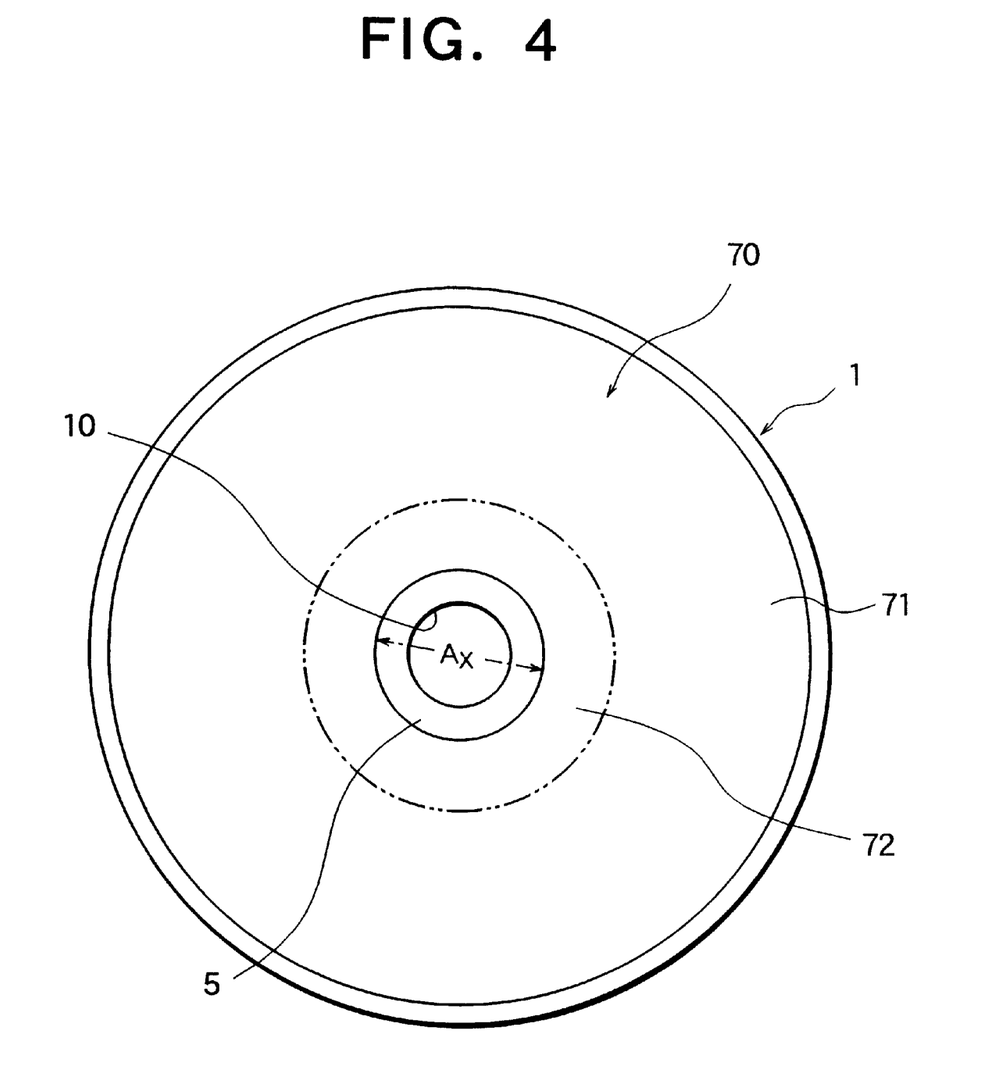
FIG. 4 is a schematic front elevational view illustrating a thin film depositing surface of an optical disc corresponding to an optical information recording medium according to the present invention.

In view of the finding as described above, the present invention provides, as shown in FIG. 4, an optical information recording medium 1 in which at least one layer of thin film 70 including a recording layer is deposited on a disc-shaped plastic substrate having a central hole 10, wherein at least a thin film showing greatest stress caused by film deposition has a strain relief region 72 inside a recording region 71 for relieving the strain cause to the substrate localization of the stress in the plane of the substrate.

Presence of the strain relief region can decrease the localization of the stress within the plane of the substrate and suppress the strain of the substrate.

The size of the strain relief region is determined by the outer diameter $A_X$ for the undeposited inner portion set upon deosition of the thin film, that is, by the diameter $A_M$ of the upper portion of the inner circumferential mask used.

The thin film deposited on the substrate of the optical information recording medium represents a dielectric layer, a recording layer, a reflection layer and the like collectively and a thin film comprising only a single layer (recording layer) or a plurality of layers (including the recording layer) is deposited depending on the kind of the information recording medium in an appropriate layer constitution.

The optical information recording media according to the present invention may include those of a structure in which a plurality of thin films are laminated. In this case, the medium may have an institution only the thin film showing the greatest stress which have the strain relief region and other thin films which do not have a strain relief region as usual, but since it is troublesome to replace the inner circumferential mask in the course of the film forming process, a medium having the strain relief region for all of the thin films can be produced more easily.

The effect of the strain relief region can be obtained effectively when the substrate has a thickness of 0.6 mm or less and the outer diameter from 80 mm to 120 mm.

In the substrate as described above, the strain relief region is formed preferably by depositing films while setting the outer diameter for the undeposited inner portion to a value capable of satisfying the following equation (1):

$$A_0 < A_X \leq -0.172P + 0.163 \qquad (1)$$

(in which $A_o$: diameter for the central aperture, $A_X$: outer diameter of the undeposited inner portion, P: entire stress caused to the thin film upon film deposition).

In this case, stress in the thin film is formed by the occurrence of structural change upon transition from a non-equilibrium state to a stable equilibrium state during or just after the film deposition. That is, when the film is deposited in a stretched state, it tends to shrink upon transition, thereby causing a tension in the substrate, whereas when the film is formed in a shrunk state, it tends to extend upon transition, thereby causing a compression in the substrate. On the other hand, during deposition of the thin film, due to the elevation of temperature both in the film and the substrate, a thermal stress also occurs in proportion with the difference of expansion coefficient between both of them (bimetal effect). Accordingly, the stress of the thin film can be considered as the internal stress and the thermal stress overlapped to each other.

The extent of the temperature elevation and the internal stress during deposition of the thin film differs depending on the thickness and the material of the substrate. Referring particularly to the thickness of the substrate, when comparing the thickness between 1.2 mm thick and 0.6 mm, the temperature reached is increased by about 10° C. in 0.6 mm thickness even under identical film forming conditions.

Accordingly, the stress of the thin film is desirably measured in a state actually deposited to the substrate. However, since such measurement is difficult, the formula (1) as described above is derived assuming the value measured by the following procedures as the entire stress P of the thin film in the preset invention.

METHOD OF MEASURING STRESS

Procedure ①

A CAPTON film of 20 $\mu$m thickness actually measured by a micrometer is cut into the size of 15 mm width and 30 mm length. The CAPTON (registered trademark of DuPont Co.) film used herein is an amorphous film of highly heat resistant polyimide obtained from pyromellitic acid anhydride.

The CAPTON film is placed on a slide glass (0.8 mm–1.0 mm thickness, 26 mm width, 76 mm length), and secured at both longitudinal ends with a heat resistant tape.

Procedure ②

The slide glass in ① above is put in a sputtering device, and a thin film is deposited to the CAPTON film under predetermined conditions.

Procedure ③

The CAPTON film is cut by a cutter knife at a position slightly inside the position of attaching the tape on both longitudinal ends. Since the CAPTON film is bent in an arcuate shape as this time, the radius of curvature is determined in accordance with the following procedure ④:

Procedure ④

Figure 5A:
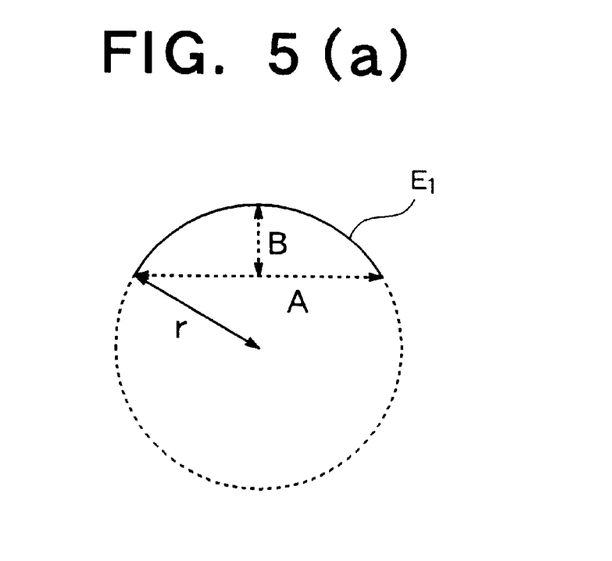
FIG. 5 is an illustrative view used for explaining a method of measuring stress of a thin film.

As shown in FIG. 5(a), when an arc $E_1$ formed by the CAPTON film is shorter than a semicircle (the center axis for the arc $E_1$ is smaller than 180°), since the length A for the chord connecting both ends of the arc $E_1$, a distance B between the center of the chord and the arc $E_1$ and the radius of curvature r satisfy the following equation (:2), A and B are measured and the radius of curvature r is calculated according to the following equation (2').

$$r^2 = (r-B)^2 + (A/2)^2 \qquad (2)$$

$$r = (B^2 + (A/2)^2)/2B \qquad (2')$$

Figure 5B:
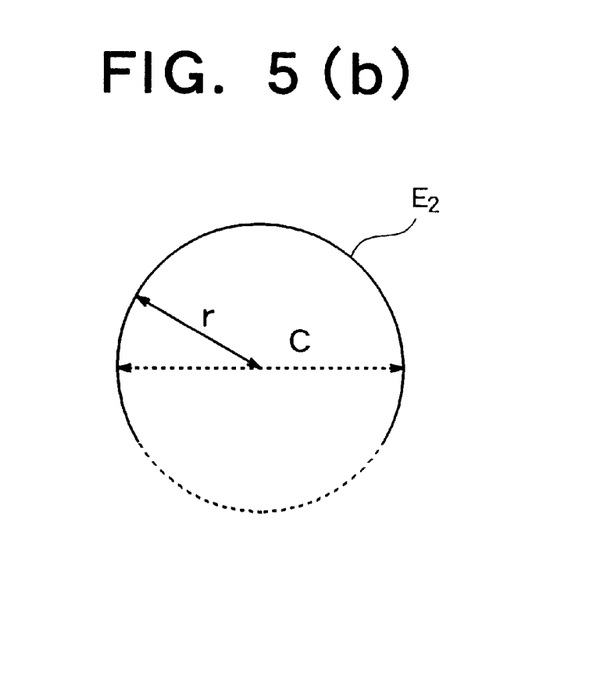

As shown in FIG. 5(b), when an arc $E_2$ formed by the CAPTON film is longer than the semi-circle (the center axis for the arc $E_2$ is larger than 180°), the diameter C for the arc $E_2$ is measured, and the radius of curvature r is calculated according to the following equation (3).

$$r = C/2 \qquad (3)$$

In each of the cases, the value is ⌈+⌋ when the thin film is at the outside of the arc and ⌈−⌋ when it is at the inside thereof.

Procedure ⑤

The entire stress P of the thin film is represented by the following approximation (4) when the thickness of the thin film is small relative to the thickness of the substrate. The internal stress σ of the thin film is represented by the following approximation (4').

$$p = (Ed^2)/(6(1-\upsilon)r) \qquad (4)$$

$$\sigma = (Ed^2)/(6(1-\upsilon)r \cdot t) \qquad (4')$$

(in which E: Young's modulus of the substrate, d; thickness of the substrate, υ: Poisson's ratio of the substrate, r: radius of curvature, t: thickness of the thin film).

Accordingly, the entire stress of the thin film is calculated according to the equation (4) by using the radius of curvature r calculated in ④, and E=25 N/mm², υ=0.3, d=20 μm of the CAPTON film used.

The method of measuring the stress is as has been described above.

In the optical information recording medium according to the present invention, when a thin film is formed by using a substrate with a thickness of 0.6 mm or less and an outer diameter from 80 mm to 120 mm or under usual film depositing conditions at high productivity (entire stress: about 0.75 N/m), strain caused in the substrate is suppressed and the focusing acceleration can be decreased by setting the diameter of the undeposited inner portion to 35 mm or less. It is further preferred that the diameter is 32 mm or less.

The effect of the strain relief region can be attained effectively in a case in which a thin film showing the greatest stress is a dielectric layer, in which the film thickness of the dielectric layer is 50 nm or more, and in which a phase-change type recording layer is deposited on the dielectric layer.

The present invention also provides an optical information recording medium having at least one layer of thin film including a recording layer formed on a disc-shaped plastic substrate having a central hole, wherein the substrate has a thickness of 0.6 mm or less and an outer diameter from 80 mm to 86 mm, and at least the thin film showing the greatest stress caused by film deposition has a diameter of the undeposited inner portion layer than the diameter of the central hole and 35 mm or less.

The optical information recording medium according to the present invention is preferably used in a state where two sheets of substrates each having at least one layer of thin film deposited on one surface are opposed and bonded to each other at the thin film depositing surfaces.

That is, in the optical information recording medium according to the present invention, while the strain of the substrate (partial deformation) is reduced by the provision of the strain relief region, a warp (entire deformation) may be caused, and such warp can be amended by the bonded structure as described above.

If the diameter of the undeposited inner portion is identical with the diameter of the central hole, the undeposited portion is not present in the inner side of the substrate (namely, the thin film is deposited as far as the position for the central hole). In a usual optical disc, a UV-ray curable resin is coated on the outermost surface of the film-deposited substrate for protecting the thin film on the substrate. If the thin film is deposited as far as the position for the central hole, protection by the UV-ray curable resin may possibly become insufficient on the side of the central hole. Accordingly, for attaining the complete protection by the UV-curable resin, the lower limit value for the diameter of the undeposited inner portion is made, for example, to about 2 mm.

Further, as described above, a circumferential groove is formed slightly outward of the central hole to a substrate produced by injection molding depending on the inner diametrical size of a stamper, and it is preferred that the range of coating the UV-ray curable resin is outside the circumferential groove in order to coating the UV-ray curable resin uniformly, for example, by spin coating. Accordingly, it is desirable to make the diameter of the circumferential groove smaller than the diameter of the undeposited inner portion, or not to form the circumferential groove by devising the method of holding the stamper in the molding die used for injection molding.

Figure 6:
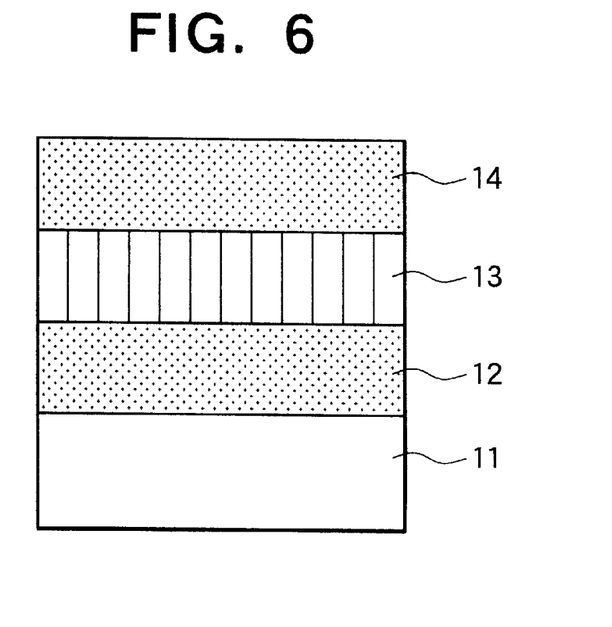
FIG. 6 and FIG. 7 are cross sectional views showing examples of laminate structures of optical information recording media.
Figure 7:
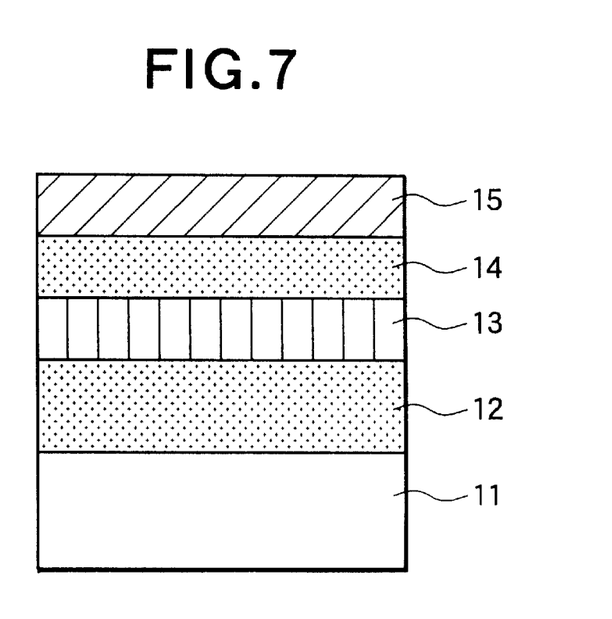

In the optical information recording medium according to the present invention, there is no restriction on the constitution of the thin film deposited on the substrate and a 3- or 4-layered laminate structure can be adopted like that in usual optical magnetic disc and a phase-change type optical disc, for example, as shown in FIG. 6 or FIG. 7.

That is, the recording layer 13 is not deposited directly on the substrate 11 but dielectric layers 12 and 14 serving as protection layers are disposed on upper and lower surfaces of the recording layer 13. In the 4-layered structure disc shown in FIG. 7, since the reflection 15 is disposed, the upper dielectric layer 14 serves also as an interference layer.

For the dielectric layers 12 and 14, materials of relatively large internal stress, for example, sulfides, oxides, nitrides, fluorides, carbides or mixtures thereof such as ZnS, $SiO_2$, SiO, $Al_2O_3$, MgO, $Si_3N_4$, AlN, $MgF_2$, SiC, ZnS—$SiO_2$ are used.

Further, the dielectric layer 12 between the substrate 11 and the recording layer 13 is generally deposited to a thickness of 50 nm or more with an aim of preventing thermal damages to the substrate 11 by repeated recording and erasing, as well as preventing intrusion of water from the substrate 11.

In the present invention, the plastic material usable for the substrate can include, for example, polycarbonate resin, acrylic resin, epoxy resin and polystyrene resin, and the use of the polycarbonate resin is preferred in view of optical characteristic and strength.

Further, there is no particular restriction, basically, on the method of depositing the thin film and any of known methods can be adopted properly, for example, vacuum vapor deposition, sputtering, ion beam sputtering, ion beam vapor deposition, ion plating, electron beam vapor deposition and plasma polymerization.

The present invention also provides a process for producing an optical information recording medium having at least one layer of a thin film including a recording layer deposited on a disc-shaped plastic substrate having a central hole wherein at least a thin film showing the greatest stress upon film deposition is deposited, while setting the outer diameter of the undeposited inner portion to a predetermined value not causing strain caused upon deposition of the thin film to the substrate.

The predetermined value is preferably a value satisfying the equation (1) when the thickness of the substrate is 0.6 mm or less.

BEST MODE FOR PRACTICING THE INVENTION

A preferred embodiment of the present invention is to be explained in details by way of concrete examples.

EXAMPLE 1

At first, a phase-change type optical disc (one-sided discs; discs have a thin film only one surface) of a layer constitution shown in FIG. 7 was prepared. That is, on a polycarbonate substrate 11 of 86 mm outer diameter, 15 mm inner diameter (diameter for central hole) and 0.6 mm thickness, were laminated a dielectric layer 12 comprising ZnS—SiO$_2$ of 240 nm thickness, a phase-change type recording layer 13 comprising SbTeGe of 30 nm thickness, a dielectric layer 14 comprising ZnS—SiO$_2$ of 20 nm thickness and a reflection layer mainly comprising Al of 50 nm thickness successively by a sputtering process.

Upon film deposition for each of the layers, the diameter for the inner circumferential mask (diameter for the undeposited inner portion) for attaching the substrate to the film-depositing device was changed as 26 mm, 30 mm, 35 mm and 40 mm, thereby depositing strain relief regions of each size inside the recording layer. Further, when the dielectric layer 12 was deposited, thin films of different stresses were deposited just on the substrate 11 by varying the power charged for sputtering.

Further, the CAPTON film described above was placed together with the substrate 11 in the film depositing device, a thin film of the same constitution was also laminated on the CAPTON film, and stress caused to the entire laminated thin film was measured using the same in accordance with the method described above. Further, a thermosensitive color label was previously stuck to the substrate and the temperature of the substrate reached upon film deposition was measured by a color of the label.

The following Table 1 shows temperatures of the substrate reached depending on the charged power and the result of measurement for the entire stress of the thin film.

TABLE 1

| Power charged | Temperature reached | Entire stress |
| --- | --- | --- |
| 6 kW | about 95° C. | 0.78 N/m |
| 5 kW | about 93° C. | 0.765 N/m |
| 4 kW | about 90° C. | 0.75 N/m |
| 3 kW | about 85° C. | 0.73 N/m |
| 2 kW | about 75° C. | 0.67 N/m |

It can be seen from the table that the temperature of the substrate reached upon film deposition and the entire stress of the laminated films are increased as the power charged for the sputtering increases.

Then, the surface of the reflection layer 15 was coated with a UV-ray curable resin. Two sheets of identical single side discs prepared as described above were opposed at the thin film depositing surfaces to each other and bonded by hot melt adhesives, to obtain a phase-change type optical disc of a structure bonded for the entire surface.

For each of the phase-change type optical discs obtained in this way, focus acceleration at a position 24 mm from the center was measured by using an optical disc mechanical characteristic measuring device LM-2100 manufactured by Ono Sokki Co. The device had a laser beam wave strength at 680 nm and an objective lens of NA=0.6, and the rotational speed was set to 1800 rpm upon measurement, thereby obtaining a linear velocity of 4.52 m/s.

In this case, the focus acceleration is a momentary acceleration for the displacement in the focusing direction of the disc (plane deflection), for which a maximum value of the momentary acceleration within the plane of the disc is used as a representative value.

The following Table 2 shows measured values (representative values) of the focus acceleration in view of a relation between the entire stress of the thin film and the diameter for the undeposited inner portion.

TABLE 2

| | | Diameter for the undeposited inner portion | | | |
| --- | --- | --- | --- | --- | --- |
| | | 26 mm | 30 mm | 35 mm | 40 mm |
| Entire stress | 0.78 N/m | 5.3 | 8.7 | 12.4 | measurement impossible |
| | 0.765 N/m | 4.8 | 5.7 | 11.3 | measurement impossible |
| | 0.75 N/m | 4.3 | 4.8 | 8.0 | measurement impossible |
| | 0.73 N/m | 4.3 | 4.5 | 5.7 | 11.8 |
| | 0.67 N/m | 4.5 | 4.3 | 4.6 | 4.7 |

(unit: m/s$^2$)

It can be seen from the table that the focus acceleration is lower and the strain of the substrate is reduced as the diameter for the undeposited inner portion is smaller. In the table, "measurement impossible" means that the strain of the substrate was too large and, therefore, the focusing servo was out of control in the device described above, so that the focus acceleration could not be measured.

Figure 8:
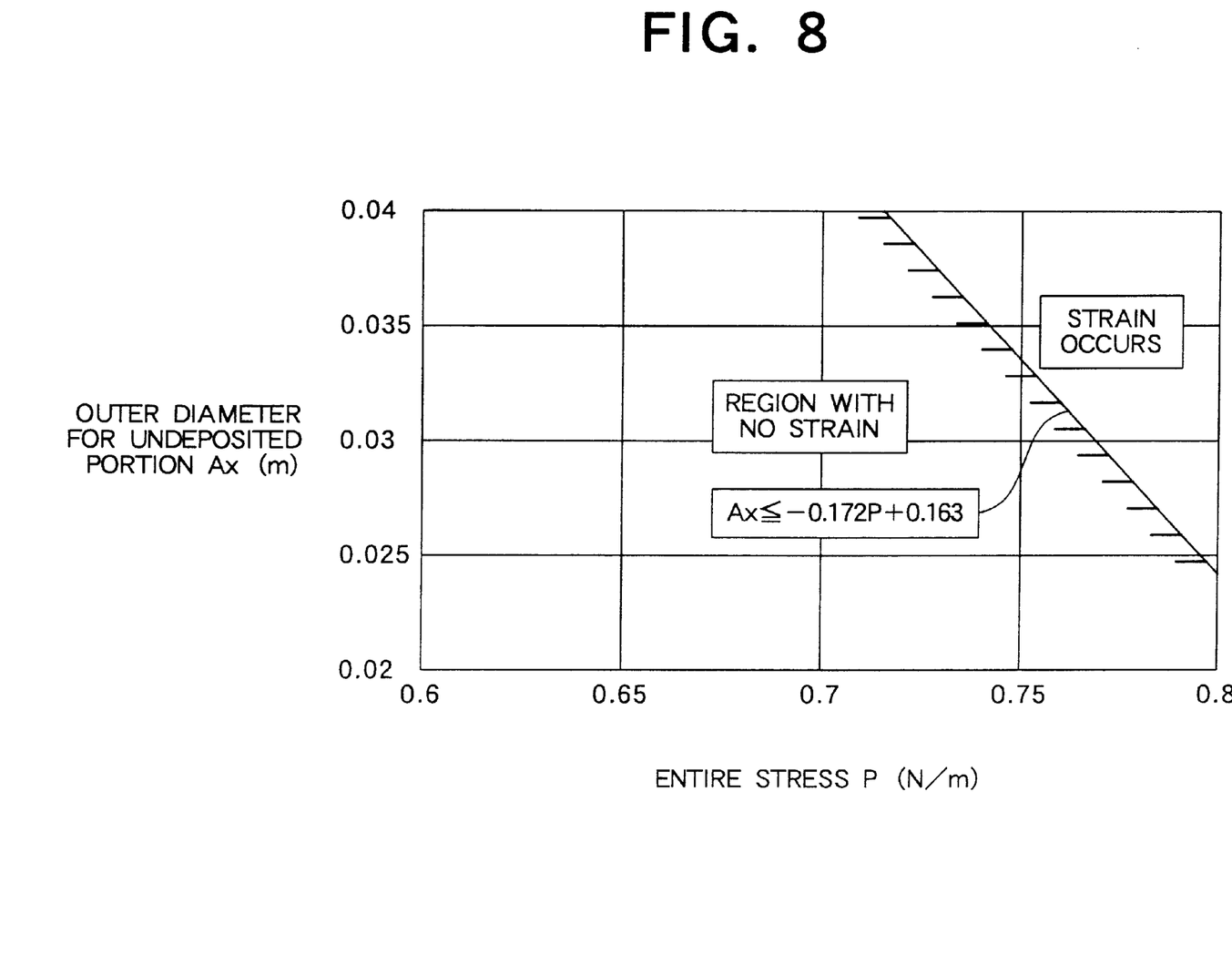
FIG. 8 is a graph illustrating a region not causing strain to the substrate in view of a relation between the outer diameter of the undeposited inner portion and the entire stress.

Under the condition of the linear velocity at 4.52 m/s as in this measurement, the strain of the substrate can be suppressed to such an extent as not causing substantially troubles (for example, errors attributable to the off-focus state) by lowering the focus acceleration to 7 m/s$^2$ or less. Then, when a range in which the focus acceleration is lower than 7 m/s$^2$ under the conditions is defined as "no strain region", it can be seen that "no strain region" is attained in a case where the outer diameter A, for the undeposited inner portion satisfies the following equation (1') as shown in FIG. 8.

$$A_X \leq -0/172P + 0.163 \tag{1'}$$

(where P is an entire stress occurring to the thin film upon film deposition).

Accordingly, the strain of the substrate can be suppressed to such an extent as not causing substantially troubles by setting the outer diameter for the undeposited inner portion so as to satisfy the equation (1') in accordance with the entire stress P in the laminated films.

EXAMPLE 2

At first, a phase-change type optical disc (one-sided discs) of a layered structure shown in FIG. 7 was prepared. That is, on a polycarbonate substrate 11 having 120 mm outer diameter, 15 mm inner diameter and 0.6 mm thickness, were laminated a dielectric layer 12 comprising ZnS—SiO$_2$ of 240 nm thickness, a phase-change type recording layer 13 comprising SbTeGe of 25 nm thickness, a dielectric layer 14 comprising ZnS—SiO$_2$ of 20 nm thickness and a reflection layer 15 mainly comprising Al of 100 nm thickness successively by a sputtering process.

Upon film deposition for each of the layers, the diameter of the inner circumferential mask (diameter for the undeposited inner portion) for attaching the substrate to the film depositing device was changed as: 15 mm, 30 mm, 32 mm, 35 mm, 38 mm and 42 mm respectively, film deposition was conducted such that the entire stress was identical, and strain relief regions of various sizes were formed inside the recording regions.

Like that in Example 1, thin films of the same constitution was laminated also on the CAPTON film together with the substrate 11, and when the entire stress was measured by using the same, it was 0.75 N/m. Further, when the temperature of the substrate reached upon film deposition was measured in the same manner as in Example 1, it was about 90° C.

Then, the surface of the reflection layer 15 was coated with a UV-ray curable resin. Two sheets of identical one-sided disc prepared in this way were opposed at the thin film depositing surfaces to each other and bonded with hot melt adhesives thereby obtaining a phase-change type optical disc of a structure bonded for the entire surface.

For each of the phase-change type optical discs obtained in this way, focus acceleration at a position 24 mm from the center was measured by using the same device as in Example 1. The linear velocity during measurement was set to 6 m/s.

The results are shown in Table 3.

TABLE 3

| Diameter for undeposited inner portion (mm) | Focus acceleration (m/s$^2$) |
| --- | --- |
| 15 | 5.7 |
| 30 | 5.3 |
| 32 | 7.2 |

TABLE 3-continued

| Diameter for undeposited inner portion (mm) | Focus acceleration (m/s$^2$) |
| --- | --- |
| 35 | 10.3 |
| 38 | measurement impossible |
| 42 | measurement impossible |

As can be seen from the result, in a case of using a polycarbonate substrate having 120 mm outer diameter and 0.6 mm thickness with the entire stress in the thin film being 0.74 N/m, the focus acceleration can be reduced to about 10 m/s$^2$ or lower at a linear velocity of 6.0 m/s if the diameter of the undeposited inner portion is 35 mm or less, so that strain of the substrate can be suppressed to such an extent as not causing substantial troubles.

Further, when the diameter for the undeposited inner portion is 32 mm or less, since the focus acceleration can be reduced to about 7 m/s$^2$ or less at the linear velocity of 6.0 m/s, the strain of the substrate can be suppressed remarkably to such an extent as capable of attaining stable recording and reading by plural drives.

EXAMPLE 3

At first, a phase-change type optical disc (one-sided discs) having a layer constitution shown in FIG. 7 was prepared. That is, on a polycarbonate substrate 11 having 80 mm outer diameter, 15 mm inner diameter and 0.6 mm thickness, were laminated a dielectric layer 12 comprising ZnS—SiO$_2$ of 240 nm thick, a phase-change type recording layer 13 comprising SbTeGe of 30 nm thick, a dielectric layer 14 comprising ZnS—SiO$_2$ of 20 nm thick and a reflection layer 15 mainly comprising Al of 50 nm of thick successively by a sputtering process.

Upon film deposition for each of the layers, the diameter of the inner circumferential mask (diameter for the undeposited inner portion) for attaching the substrate to the film depositing device was changed as: 15 mm, 32 mm, 35 mm, 38 mm and 40 mm respectively, film deposition was conducted such that the entire stress was identical, and strain relief regions of various sizes were formed inside the recording regions.

Like that in Example 1, thin films of the same constitution was laminated also on the CAPTON film together with the substrate 11, and when the entire stress was measured by using the same, it was 0.74 N/m. Further, when the temperature of the substrate reached upon film deosition was measured in the same manner as in Example 1, it was about 90° C.

Then, the surface of the reflection layer 15 was coated with a UV-ray curable resin. Two sheets of identical one-sided discs prepared in this way were opposed at the thin film depositing surfaces to each other and bonded with hot melt adhesives, thereby obtaining a phase-change type optical disc of a structure bonded for the entire surface.

For each of the phase-change type optical discs obtained in this way, focus acceleration at a position 24 mm from the center was measured by using the same device as in Example 1. The linear velocity during measurement was set to 6 m/s.

The results are shown in the following Table 4.

TABLE 4

| Diameter for undeposited inner portion (mm) | Focus acceleration (m/s$^2$) |
| --- | --- |
| 15 | 5.0 |
| 32 | 5.5 |
| 35 | 8.4 |
| 38 | 14.9 |
| 40 | measurement impossible |

As can be seen from the result, in a case of using a polycarbonate substrate having 80 mm outer diameter and 0.6 mm thickness with the the entire stress in the thin film being 0.75 N/m, the acceleration can be reduced to about 10 m/s$^2$ or lower at a linear velocity of 6.0 m/s if the diameter of the undeposited inner portion is 35 mm or less, so that strain of the substrate can be suppressed to such an extent as not causing substantial troubles.

Further, when the diameter of the undeposited inner portion is 32 mm or less, since the focus acceleration can be reduces to about 7 m/s$^2$ or less at a linear velocity of 6.0 m/s, the strain of the substrate can be supposed remarkably to such an extent as capable of attaining stable recording and reading by plural drives.

Meanwhile, in each of the examples described above, phase-change type optical discs of 0.6 mm thickness are mentioned as the optical information recording media, but the present invention is applicable to any of optical information recording media so long as they can at least reading information by the irradiation of a laser beam or the like.

INDUSTRIAL APPLICABILITY

In the optical information recording medium according to the present invention, occurrence of the strain of the substrate can be prevented with no restriction for the film constitution or the conditions for depositing the films even in an optical disc comprising a plastic substrate as thin as 0.6 mm thickness. As a result, troubles caused by the off-focus state less occurs. Accordingly, it is suitable as an optical information recording medium for use in an optical disc system with increased capacity.

Further, the production process according to the present invention is suitable to a process for producing such an optical information recording medium.

What is claimed is:

1. An optical information recording medium having at least one layer of a thin film including a recording layer deposited on a disc-shaped plastic substrate having a central hole, wherein at least a thin film showing the greatest stress caused by film deposition has a strain relief region inside a recording region for relieving the strain caused by localization of the stress in the plane of the substrate, and the substrate has a thickness of 0.6 mm or less and an outer diameter of from 80 mm to 120 mm, the strain relief region being deposited by depositing a film while setting the outer diameter of an undeposited inner portion to a value satisfying the following formula (1):

$$A_0 < A_X \leq -0.172P + 0.163 \qquad (1)$$

(where $A_0$: diameter for the central hole, $A_X$: outer diameter of the undeposited inner portion, P: entire stress caused upon film deposition).

2. An optical information recording medium having at least one layer of a thin film including a recording layer deposited on a disc-shaped plastic substrate having a central hole, wherein at least a thin film showing the greatest stress caused by film deposition has a strain relief region inside a recording region for relieving the strain caused by localization of the stress in the plane of the substrate, and the substrate has a thickness of 0.6 mm or less and an outer diameter of from 80 mm to 120 mm, the strain relief region being formed by setting the outer diameter of the undeposited inner portion to 35 mm or less.

3. An optical information recording medium having at least one layer of a thin film including a recording layer deposited on a disc-shaped plastic substrate having a central hole, wherein at least a thin film showing the greatest stress caused by film deposition has a strain relief region inside a recording region for relieving the strain caused by localization of the stress in the plane of the substrate, and the substrate has a thickness of 0.6 mm or less and an outer diameter of from 80 mm to 120 mm, the strain relief region being formed by setting the outer diameter of the undeposited inner portion to 32 mm or less.

4. An optical information recording medium as defined in claims 1, 2 or 3, wherein the thin film showing the greatest stress is a dielectric layer.

5. An optical information recording medium as defined in claim 4, wherein the film thickness of the dielectric layer is 50 nm or more.

6. An optical information recording medium as defined in claim 4, wherein a phase-change type recording layer is deposited on the dielectric layer.

7. An optical information recording medium as defined in claims 1, 2 or 3, wherein two sheets of substrates are bonded in which thin film depositing surfaces are opposed to each other.

8. An optical information recording medium having at least one layer of thin film including a recording layer deposited on a disc-shaped plastic substrate having a central hole, wherein the substrate has a thickness of 0.6 mm or less and an outer diameter of from 80 mm to 86 mm, and at least a thin film showing the greatest stress caused by film deposition has a diameter for the undeposited inner portion of more than the diameter of the central hole and 35 mm or less.

9. A process for producing an optical information recording medium having at least one layer of thin film including a recording layer deposited on a disc-shaped plastic substrate having a central hole, wherein at least a thin film showing the greatest stress upon film deposition is deposited, while setting the outer diameter of the undeposited inner portion to such a predetermined value as not causing strain to the substrate caused by deposition of the thin film, wherein the predetermined value satisfies the following equation (1) in a case where the thickness of the substrate is 0.6 mm or less:

$$A_0 < A_X \leq -0.172P + 0.163 \qquad (1)$$

(wherein $A_0$: diameter for the central hole, $A_X$: outer diameter for the undeposited inner portion, P: entire stress resulting in the film upon deposition of the film).

\* \* \* \* \*

UNITED STATES PATENT AND TRADEMARK OFFICE
CERTIFICATE OF CORRECTION

PATENT NO. : 6,258,432 B1
DATED : July 10, 2001
INVENTOR(S) : Masato Terada, Tatsuya Okamura and Kazuyuki Furuya It is certified that error appears in the above-identified patent and that said Letters Patent is hereby corrected as shown below:

Title page,
Under [86], §371 Date and §102 (e) Date, change both "Apr. 27, 1999" to -- Apr. 26, 1999 --.

Column 9,
Line 2, change "A" to -- $A_N$ --.

Signed and Sealed this

Ninth Day of April, 2002

Attest:

JAMES E. ROGAN
*Director of the United States Patent and Trademark Office*

*Attesting Officer*